United States Patent
Thompson et al.

(10) Patent No.: US 6,945,481 B2
(45) Date of Patent: Sep. 20, 2005

(54) DUAL MODE SPREADER

(75) Inventors: Peter G. Thompson, North Olmsted, OH (US); Kirk A. Hurto, Dublin, OH (US); Mark G. Prinster, Douglasville, GA (US)

(73) Assignee: Lesco Technologies, LLC, Strongsville, OH (US)

( * ) Notice: Subject to any disclaimer, the term of this patent is extended or adjusted under 35 U.S.C. 154(b) by 205 days.

(21) Appl. No.: 09/965,260

(22) Filed: Sep. 27, 2001

(65) Prior Publication Data

US 2003/0057303 A1 Mar. 27, 2003

(51) Int. Cl.⁷ ............... A01C 15/00; A01C 15/02; A01C 19/00
(52) U.S. Cl. .................. 239/663; 239/650; 239/652; 239/655; 239/664; 239/665
(58) Field of Search .................. 239/663, 650, 239/652, 655, 664, 665, 666, 668, 669, 679, 680, 681, 722, 223, 224, 289

(56) References Cited

U.S. PATENT DOCUMENTS

| | | |
|---|---|---|
| 32,992 A | 8/1861 | Gorham |
| 1,618,443 A | 2/1927 | Knight |
| 3,178,079 A | 4/1965 | Johnson |
| 3,204,588 A | 9/1965 | Johnson |
| 3,474,746 A | 10/1969 | Hiniker |
| 4,032,074 A | 6/1977 | Amerine |
| 4,588,113 A * | 5/1986 | Egerdahl ............... 239/663 |
| 4,798,325 A * | 1/1989 | Block ................... 239/663 |
| 4,867,381 A * | 9/1989 | Speicher ............... 239/665 |
| 4,971,255 A | 11/1990 | Conrad |
| 5,145,116 A * | 9/1992 | Shaver ................. 239/665 |
| 5,294,060 A * | 3/1994 | Thompson ............. 239/656 |
| 5,370,321 A | 12/1994 | Bianco |
| 5,485,963 A | 1/1996 | Walto et al. |
| 5,645,228 A | 7/1997 | Zwart |
| 5,992,134 A * | 11/1999 | Blide et al. ............ 56/16.8 |
| 6,138,927 A | 10/2000 | Spear et al. |

* cited by examiner

Primary Examiner—Davis Hwu
(74) Attorney, Agent, or Firm—Calfee, Halter & Griswold LLP

(57) ABSTRACT

A dual mode spreader for broadcast spreading and drop spreading material comprising a hopper to hold a supply of spreadable material, first and second discharge openings located within the hopper for which spreadable material can flow therethrough, an impeller mounted in a position below the hopper for rotational movement about an upright axis, wherein the first discharge opening leads to impeller to enable the spreadable material in the hopper to exit therefrom onto the impeller to be distributed in a path outwardly therefrom onto the surface to be treated; and a diffuser defining an inlet opening and an outlet opening, wherein the second discharge opening is in communication with the inlet opening to enable the spreadable material in the hopper to enter the diffuser and exit therefrom through the outlet opening to be distributed in a path downwardly therefrom onto the surface to be treated.

21 Claims, 4 Drawing Sheets

DUAL MODE SPREADER

FIELD OF INVENTION

Figure 1:
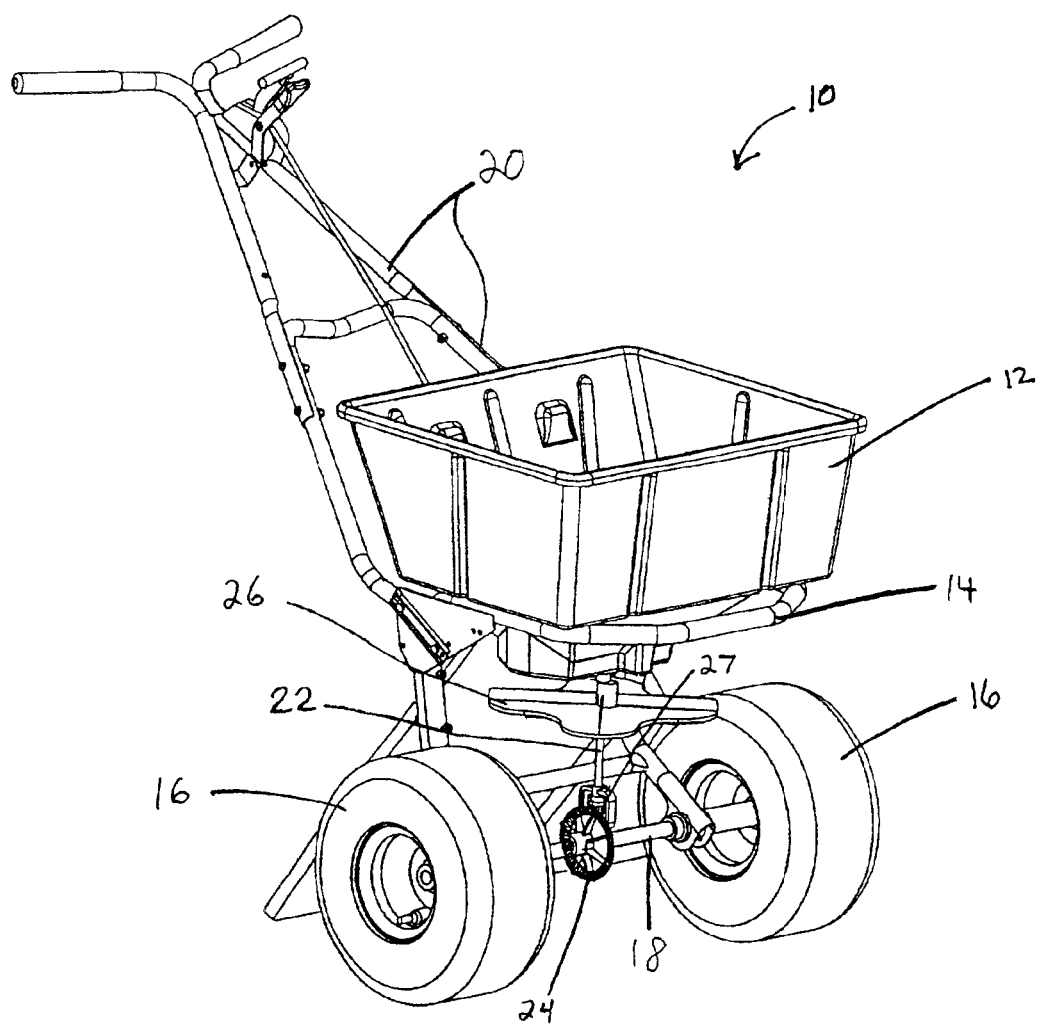

The present invention relates generally to a device for distributing a spreadable material over a selected ground area, and more particularly, to dual mode spreader that can distribute spreadable material in both a broadcast mode to distribute the material outwardly from the spreader in a less controlled pattern over a relatively wide area and a drop mode to release the material downwardly from the spreader in a controlled pattern over a narrower area.

BACKGROUND OF THE INVENTION

It is well known in the art to use material spreader devices to distribute all types of spreadable material over a selected ground area. Such material spreader devices distribute fertilizers, pesticides, seeds, ice melters, salt, or other materials in particulate or finely divided form over a selected ground area. Generally, material spreaders known in the art can be classified in two general categories: broadcast spreaders and drop spreaders.

Broadcast spreaders generally disperse spreadable material radially outwardly from a hopper holding a quantity of spreadable material. Generally, the spreadable material exits a plurality of large apertures in the bottom of the hopper and drops onto a rotating impeller that rotates in a plane generally parallel to the ground. As the spreadable material interacts with the rotating impeller, the spreadable material is broadcast in an outwardly direction therefrom.

Drop spreaders generally discharge spreadable material downwardly from a hopper holding a quantity of spreadable material onto a selected ground area. Generally, the spreadable material exits a plurality of apertures located in the bottom of the hopper and drops by gravity onto the selected ground area. Drop spreaders generally have a rotatable bar having a radially extending flange mounted just above the apertures at the bottom of the hopper. The rotatable bar assists in breaking up large particles so that they can exit the apertures and further promotes even distribution of the spreadable material over all the apertures within the hopper.

Broadcast spreaders offer several advantages over drop spreaders regarding their use. Broadcast spreaders cast material outwardly over a path wider than the width of the spreader. Therefore, broadcast spreaders can cover a large area with spreadable material relatively quickly as opposed to the narrow paths of drop spreaders. Broadcast spreaders also broadcast spreadable material at a distance above the ground, thereby encountering fewer problems in tall or wet turf or over difficult terrain. Broadcast spreaders push easier, allow faster use, and offer ease of application due to the wide distribution swath and the "feathering" effect at the edges of the distribution pattern. The feathering, or less dense distribution of spreadable material at the edges of the pattern, permits overlap between successive paths thereby permitting a certain amount of error in broadcast application without causing streaking problems. Broadcast spreaders also utilize only a few large metering ports to discharge the spreadable material rather than a series of small ports, thus accommodating larger particle sizes.

However, the several advantages of broadcast spreaders also account for several distinct disadvantages with regard to their use. The most significant disadvantage of broadcast spreaders is the "feathering" effect or lack of control of the distribution pattern. The relatively non-uniform distribution pattern of broadcast spreaders can create numerous application problems. Specifically, the central portion of the distribution pattern has a relatively high particle density and the outer portions or edges of the distribution pattern have a relatively low particle density. In addition, broadcast spreaders are susceptible to pattern changes under windy conditions.

Drop spreaders offer several advantages over broadcast spreaders regarding their use. Drop spreaders are very precise in providing a controlled distribution pattern, a factor of importance in spreading control products such as herbicides. When accurate application of materials is critical, e.g. application of a product near walkways, flower beds, etc., drop spreaders distribute material in a highly uniform pattern over a path essentially the width of the spreader. Further, the uniformity of distribution afforded by drop spreaders does not generally depend on particle size or density because material is dropped by gravity to the ground. Drop spreaders are also generally not effected by wind conditions because they distribute material close to the ground.

However, like broadcast spreaders, the several advantages of drop spreaders also attribute to distinct disadvantages with regard to their use. Because the path width of the applied material is limited to the width of the spreader, drop spreaders are typically slower in covering a ground area of a given size with material as compared to the broadcast spreaders. Also, because the path width is well defined, gaps and/or overlapping occurring between adjacent paths can cause streaking unless the drop spreader is carefully navigated along a path immediately adjacent a previously traversed path. Gaps and overlapping may be undesirable depending on the material being applied. Further, the low ground clearance of the drop spreader may present difficulties when attempting to traverse terrain with high vegetation, ground cover, or abrupt changes in ground contour. Drop spreaders are also sometimes hard to propel, particularly when the container is filled to capacity because the wheels engage the rotating bar within the hopper. Finally, it is sometimes difficult for traditional drop spreaders to consistently provide spreadable material in the lateral direction due to the failure of the rotating bar to push spreadable material laterally within the hopper.

Because both broadcast and drop spreaders have distinct advantages and disadvantages, users are either required to have both types of spreaders or utilize one type of spreader for all applications. Particularly, when applying a spreadable material to a lawn near flower beds, driveways, or sidewalks, a drop spreader more accurately distributes the spreadable material in the concentration desired. Using a broadcast spreader for the same task results in either a low particle density in the area nearest the flower bed, etc. or the misapplication of spreadable material on the flower bed, driveway, or sidewalk. There has been very little effort in the art to provide a spreader having the advantages of both the broadcast and drop spreaders while addressing the disadvantages of both.

U.S. Pat. No. 4,032,074 to Amerine discloses a material spreader having a rotary broadcast type spreader that includes deflection means for deflecting the broadcast material downwardly to form a uniform pattern of controlled configuration. An impeller on the material spreader sends the material outwardly 360 degrees into contact with the interior of the shroud that deflects the material onto the ground in a uniform pattern. However, the '074 material spreader is not constructed to be reconfigured to function as a conventional broadcast type spreader and therefore has limited utility. A need exists for a material spreader that can function as both a broadcast and drop spreader, thereby providing the advantages of both types of spreaders.

U.S. Pat. No. 6,138,927 to Spear et al., hereby incorporated by reference in its entirety into the present application for all material disclosed therein, discloses a dual mode spreader having a spreader disk and a movable elliptical deflection skirt. The deflection skirt is movable between (1) a broadcast position disposed above the path of distribution of the spreadable material by the spreader disk enabling the spreadable material to be broadcast onto a ground area, and (2) a drop position disposed within the path of distribution of the spreadable material by the spreader disk to deflect the spreadable material to move downwardly onto a ground area from the periphery thereof. A disadvantage with the '927 dual mode spreader construction is that the device utilizes the spreader disk in both the broadcast mode and the drop mode. Any disablement of the spreader disc or the broadcasting means of the device will also disable the use of the spreader in the drop mode. Further, the drop mode is not constructed to accurately distribute spreadable material over a specifically defined area (e.g. adjacent walkways, flowerbeds, or driveways. Because the spreader disc launches spreadable material into contact with the elliptical skirt, and the spreadable material deflects off the skirt interior, spreadable material very often falls outside the desired path of the spreader and contaminates adjacent areas.

Therefore, there is a need in the art for a device that can utilize the advantages of both a broadcast spreader and drop spreader and overcome the disadvantages of the prior art devices.

SUMMARY OF INVENTION

It is an object of the present invention to provide a dual mode spreader that is convertible between a broadcast mode and a drop mode so as to provide the advantages of both devices while eliminating many of the disadvantages of each.

The forgoing and other objects of this invention are achieved by the provision of a dual mode spreader comprising a hopper to hold a supply of spreadable material, first and second discharge openings located within the hopper for which the spreadable material can flow therethrough, an impeller mounted below the hopper for rotational movement about an upright axis, the first discharge opening leading to the impeller to enable the spreadable material to be distributed in a path outwardly therefrom during the rotational movement of the impeller, and a diffuser defining an inlet opening and an outlet opening, the second discharge opening in communication with the inlet opening to enable the spreadable material in the hopper to enter the diffuser and exit therefrom through the outlet opening to be distributed in a path downwardly therefrom onto the surface to be treated.

In the preferred embodiment of this invention, a dual mode spreader having conventional broadcasting means for broadcasting spreadable material onto a surface to be treated further comprises a diffuser attached to the spreader to provide means for drop spreading the spreadable material onto a surface to be treated. The diffuser associated therewith may utilize a plurality of baffles and pins located within the diffuser that diffuse the spreadable material as it falls therethrough to evenly distributed the spreadable material across the entire width of the outlet opening. The diffuser may also comprise a removably mounted wall to permit access to the interior of the diffuser. The preferred embodiment further provides a dual mode spreader wherein the means for broadcasting the spreadable material onto a surface to be treated is independent from the means for dropping the spreadable material onto a surface to be treated.

The dual mode spreader of this invention may also utilize means for controlling the flow of spreadable material through the discharge openings of the hopper to control the rate of spreadable material used by the spreading means. The means for controlling the flow of spreadable material may also include easily observable indicia making it possible to accurately identify the flow rate of spreadable material between full flow of a gate open position and no flow of a gate closed position.

The present invention will be more fully described in the written description with reference to the accompanying drawings.

BRIEF DESCRIPTION OF THE DRAWINGS

FIG. 1 is a perspective view of a dual mode spreader according to this invention;

FIG. 2 is an exploded view of the dual mode spreader of FIG. 1 showing the parts thereof, FIG. 3 is an elevated plan view of the hopper of the dual mode spreader according to the present invention; and FIG. 4 is an exploded view of the diffuser of the dual mode spreader according to the present invention showing the parts thereof.

DETAILED DESCRIPTION OF THE PREFERRED EMBODIMENT OF THE INVENTION

Referring now to the drawings, the preferred embodiment and best mode of a dual mode spreader, generally designated 10, is shown in FIG. 1. As best shown in FIG. 2, the spreader 10 comprises a hopper 12, for holding a supply of spreadable material, mounted to a frame 14. Frame 14 is connected to a pair of ground-engaging wheels 16 via axle 18. Frame 14 is also connected to handle 20 to enable a user to manually propel the hopper 12 over a selected ground area by rolling the wheels 16 along the ground.

The dual mode spreader is preferably made almost entirely of molded plastics so as to be generally lightweight, corrosion resistant, durable, and easy to manufacture, transport and assemble. It is understood, however, that any appropriate materials can be used to construct any of the structures of the spreader 10.

One or both wheels 16 are fixedly connected to axle 18 for transmitting power to vertical shaft 22 by means of a first bevel gear 24 fixedly mounted on axle 18 in meshing relationship with a second bevel gear 27 fixedly mounted on vertical shaft 22 at right angles to first bevel gear 24. Therefore, the wheels 16 are in power drive connection with impeller 26 connected to vertical shaft 22 for rotation thereof. The wheels 16 are also in power drive connection with the clearing member 28, as discussed below, for breaking up material held within the hopper 12 so that it may pass through the apertures in the bottom of the hopper.

As particularly shown in FIGS. 2 and 3, hopper 12 has a large upper portion and small lower portion so that spreadable material held within hopper 12 is directed toward the discharge openings located in the bottom of hopper 12. As shown in the elevational view of FIG. 3, hopper 12 is provided with a plurality of discharge openings 30,32 that allow spreadable material held therein to flow from the hopper 12. However, it would be apparent to one skilled in the art that the present invention could be modified to utilize a single discharge opening or numerous discharge openings as a matter of design preference. Discharge openings 30 are disposed above the broadcast spreading means and discharge opening 32 is disposed above the drop spreading means to independently supply spreadable material thereto. It should also be apparent to one skilled in the art that the discharge openings 30,32 could be located anywhere on the bottom wall or side walls of the hopper. For example, the discharge opening 32 could be located on the back wall of the hopper 12. The constraints in locating discharge openings 30,32 on hopper 12 are ensuring proper flow and ensuring that the diffuser does not disrupt the rotary spreader and visa versa.

The dual mode spreader 10 of this invention further includes means for controlling the flow of spreadable material from the hopper 12. Such material flow control means control the effective size of the discharge openings 30,32 by regulating the amount the openings are covered between fully closed and fully opened conditions to start, stop, and meter the flow of spreadable material from hopper 12 to the broadcast means and drop spreader means. Preferably, a flow controlling means performs this function in the broadcast spreading mode and a second flow controlling means performs this function in the drop spreading mode.

Although numerous configurations of means for controlling the flow of spreadable material could be used, a traditional gate means mounted to the exterior of hopper 12 is preferred. The gate means for controlling the flow of spreadable material through discharge openings 30 is identical in construction to the gate means for controlling the flow of spreadable material through discharge opening 32. The gate means, as known in the art and not shown herein, is movable between an open position wherein said spreadable material can flow through the discharge openings 30,32 and a closed position wherein spreadable material is prevented from exiting the hopper 12 through the discharge openings 30,32 and adjustable therebetween.

Particularly, a gate means is mounted to the exterior of hopper 12 controlling the flow of spreadable material that exits discharge openings 30 and a second gate means is mounted to the exterior of hopper 12 controlling the flow of spreadable material that exits discharge opening 32. As is known in the art, each gate means comprises a pair of guides mounted to the exterior of hopper 12 that confines a slidable plate therebetween. The incremental adjustable movement of the slidable plate between an open position and a closed position permits a specified quantity of spreadable material to exit the hopper 12. Therefore, accurate adjustment of the material flow rate is possible.

The amount of particulate material flowing through discharge openings 30,32 is metered by adjustment of the size of the openings, accomplished by the movement of the plate mounted beneath the hopper 12. The plate is movable between a fully closed position and a fully open position to start, stop, and meter the flow of material from the openings 30,32 onto the impeller 26 or into the diffuser 34. More specifically, the plate is spring biased to move into its fully closed position with respect to the discharge openings 30,32 and is constructed and arranged to be moved against the spring bias from the fully closed position toward a fully opened position with respect to the discharge openings 30,32.

A control rod 36 is attached at one end of the plate and extends toward handle 20 where it is attached to a pivoted lever 38, secured at its pivot point to handle 20. The flow control means for both the diffuser 34 and the impeller 26 are identical in construction and is explained herein only once, but is applicable to the flow control means usable for both spreading means. Adjustment of lever 38 slides the plate from a position in which the plate completely covers the discharge openings 30,32 to a position in which the plate does not cover the discharge openings 30,32 and visa-versa. When the spreader user pivots the lever 38, the control rod 36 is pulled thereby causing the plate to move rearwardly against its spring bias to uncover the discharge openings 30,32 and to allow the material in the hopper 12 to flow downwardly therefrom. The effective length of the control rod 36 determines the amount the discharge openings 30,32 are uncovered when the lever 38 is pivoted to its operative position. It can further be appreciated that pivoted lever 38 may also include observable indicia making it possible to accurately identify the flow rate of spreadable material between full flow of the gate open position and no flow of the gate closed position.

Impeller 26 is mounted on vertical shaft 22 (which defines the rotational axis 40 of the impeller 26) preferably made of tubular hard molded plastic or other material of suitable strength. The shaft 22 extends through the bottom of the hopper 12. An opening clearing member 28 is secured to the shaft 22 in a position above the discharge openings 30,32 to move in clod clearing relation with the discharge openings 30,32 when the shaft 22 is rotated. Preferably the clearing member 28 comprises a metal member having a plurality of outwardly extending metal clearing arms 37.

The shaft 22, the impeller 26 secured to the shaft 22, and the clearing member 28 secured to the shaft 22 are rotated as a unit by a gear assembly that transmits power thereto from the manual rotational movement of the wheels 16 when the spreader 10 is pushed. More specifically, a first bevel gear 24 is rigidly mounted on an axle 18 that extends between the wheels 16 and is integrated with a second bevel gear 27 rigidly mounted on the shaft 22 so that rotation of the wheels 16 rotates the shaft 22, impeller 26, and clearing member 28.

Figure 4:
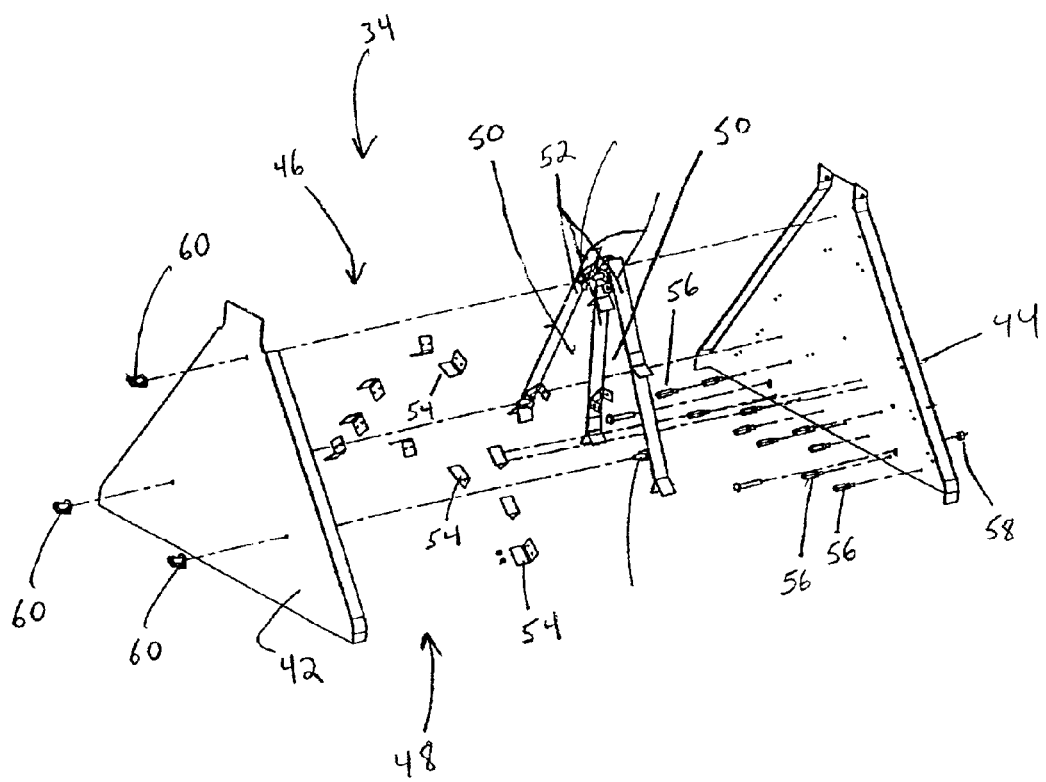

The preferred means for drop spreading material onto a selected ground area comprises a diffuser 34, connected to the exterior of hopper 12. As best shown in FIG. 4, the diffuser 34 comprises a generally inverted V-shaped housing comprising a front plate 42 and a rear plate 44 which define inlet opening 46 and outlet opening 48. Preferably, diffuser 34 includes a plurality of channels 50 defined by rails 52. Located within the channels 50 are a plurality of baffles 54 and pins 56 mounted to rear plate 44. Discharge opening 32 communicates with inlet opening 46 to enable spreadable material in hopper 12 to enter diffuser 34. Spreadable material entering the diffuser 34 is initially separated by rails 52 and therefore flows into channels 50. Spreadable material is laterally diffused within each channel as it comes into contact with the plurality of baffles 54 and pins 56. The spreadable material is consistently diffused until the now diffused spreadable material exits the diffuser 34 through the outlet opening 48 to be distributed in a path downwardly therefrom onto the surface to be treated. Preferably, the outlet opening 48 of the diffuser 34 is positioned at a distance close to the surface to be treated to minimize the effects of wind and to obtain more accurate spreading of the material. Preferably, the outlet opening 48 of the diffuser is positioned approximately 4 inches from the surface to be treated, although numerous other distances could be utilized to achieve desired results. Front plate 42 is also preferably removably mounted to rear plate 44 by screw 58 and wing nut 60 connection to permit access to the interior of diffuser 34 for cleaning, repair, or unclogging.

Figure 2:
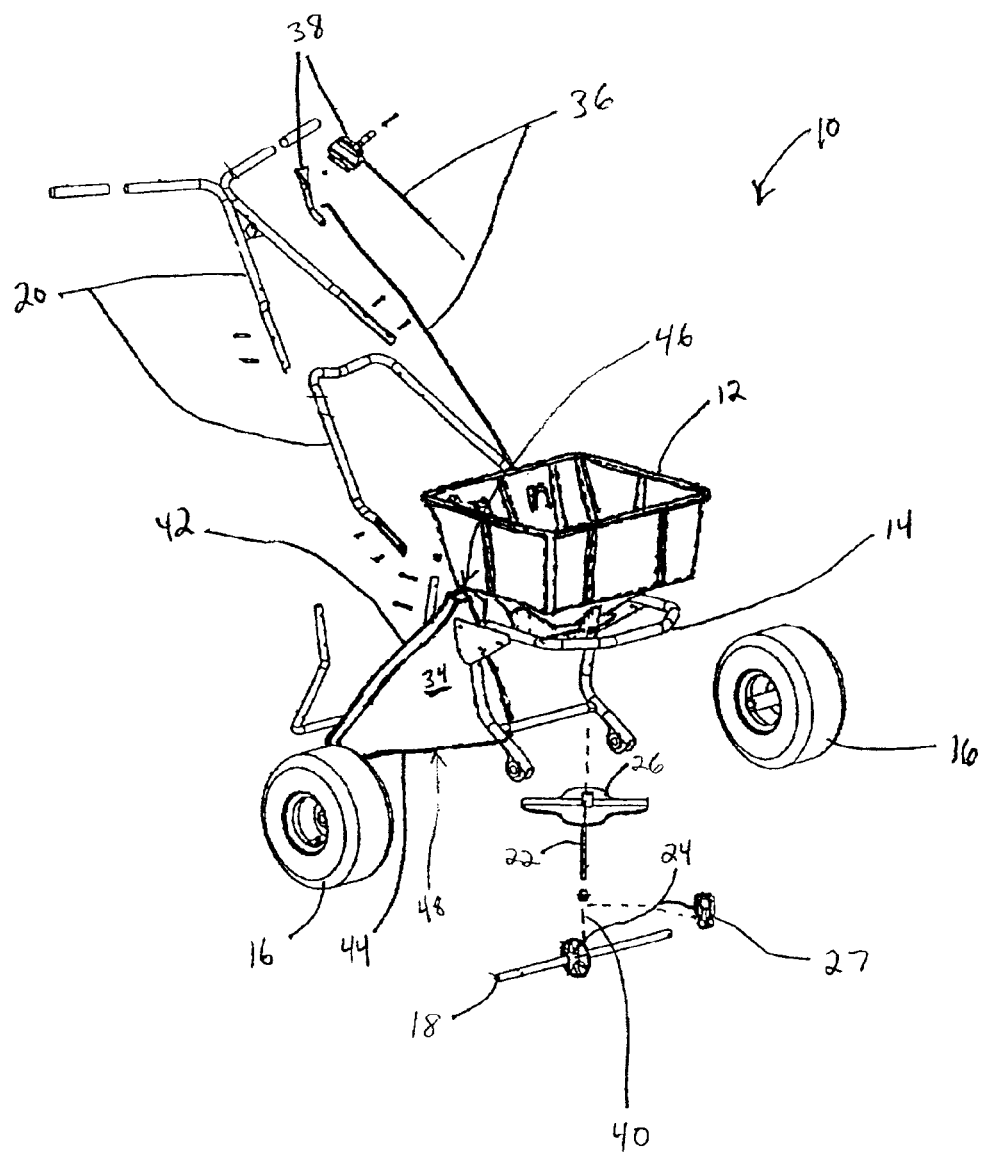
Figure 3:
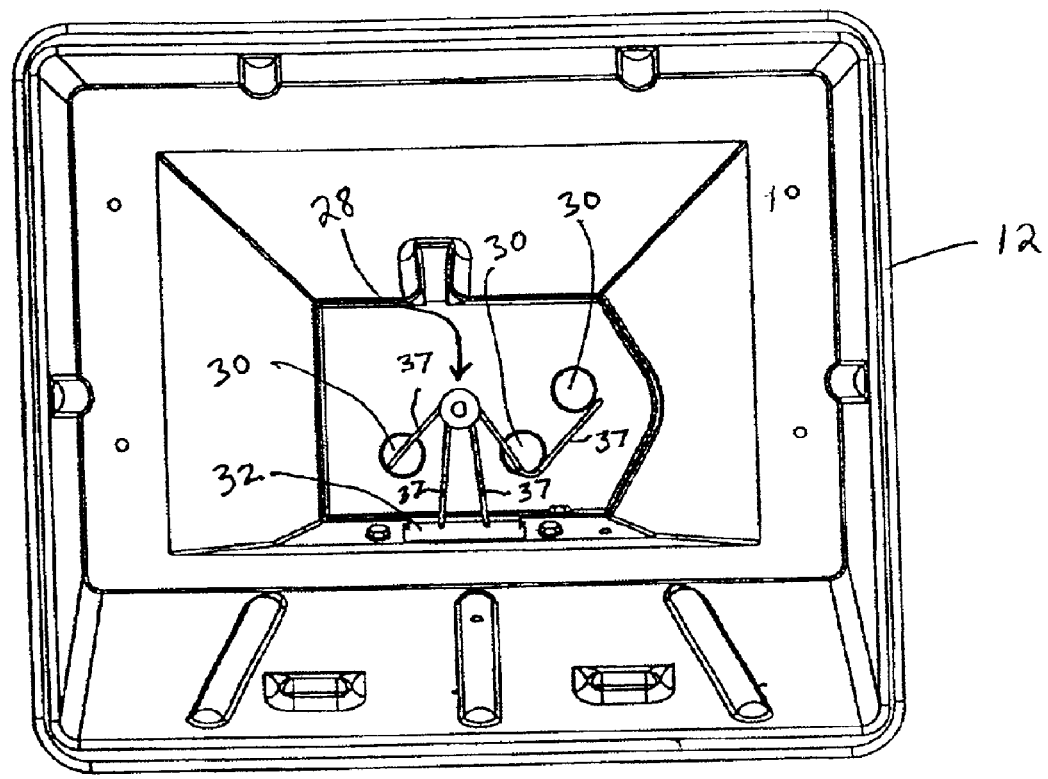

As also shown in FIG. 2, the preferred means for broadcast spreading material onto a select ground area comprises an impeller 26 mounted in a position below the hopper 12. As in conventional broadcast spreaders, impeller 26 is mounted below hopper 12 for rotational movement about an upright axis, generally designated 40. In response to rotation of wheels 16, the gear assembly 24,27 transfers rotational movement to impeller 26. As spreadable material exits hopper 12 through discharge opening 30 onto rotating impeller 26, the impeller 26 broadcasts the spreadable material radially outwardly from the spreader 10. Impeller 26 is preferably made of a molded plastic and has a plurality of upwardly extending blades integrally formed thereon, preferably 90 degrees apart. However, it would be apparent to one skilled in the art that the spreader impeller 26 can be any appropriate rotary member that is constructed and arranged to rotate in coordinated relation with the rolling of the wheels 16 and in cooperating relation with discharge opening 30 to broadcast spreadable material onto the ground.

To use the spreader 10 in the drop mode, the hopper 12 is filled with a selected spreadable material. When the spreader user pivots lever 38, control rod 36 is pulled thereby causing plate to move rearwardly against its spring bias (either partially, fully or incrementally therebetween, depending on the desired opening size indicated) to uncover the discharge opening 32 and to allow the material in the hopper 12 to flow downwardly therefrom and into diffuser 34. As the spreader 10 rolls forwardly, the clearing member 28 oscillates above the discharge opening 32 breaking up any clods of material to allow the material to fall through the uncovered opening 32.

Spreadable material entering the inlet opening 46 of the diffuser 34 is initially separated by rails 52 and therefore flows into channels 50. Spreadable material is laterally diffused within each channel 50 as it comes into contact with the plurality of baffles 54 and pins 56. The spreadable material is consistently diffused until the now diffused spreadable material exits the diffuser 34 through the outlet opening 48 to be distributed in a path downwardly therefrom onto the surface to be treated.

When the user reaches the end of the path along which the material has been spread, the lever 38 is pivoted allowing the plate to move into covering relation with the discharge opening 32 to stop the particle flow. The spreader 10 is moved until it is directed along a path immediately adjacent the path just covered with material. The lever 38 is again pivoted to partially or fully open the discharge opening 32 to allow spreadable material to flow through the diffuser 34. The user rolls the spreader 10 along the desired path. This procedure is followed until the ground is covered with material.

To use the spreader 10 in broadcast mode, the hopper 12 is filled with a selected spreadable material. When the spreader user pivots lever 38, control rod 36 is pulled thereby causing plate to move rearwardly against its spring bias (either partially, fully or incrementally therebetween, depending on the desired opening size indicated) to uncover the discharge opening 30 and to allow the material in the hopper 12 to flow downwardly therefrom and onto impeller 26.

With the hopper 12 containing particulate matter, the user rolls the hopper 12 along a path to be covered with material and pivots lever 38 to its operative position. This opens the plate a desired degree to partially or completely uncover the discharge openings 30. As the spreader 10 rolls forwardly, the clearing member 28 rotates above the discharge openings 30 breaking up any clods of material to allow the material to fall through the uncovered openings 30.

The material falls onto the impeller 26 at a position generally rearward of the axis 40 and the rotating impeller 26 directs the material outwardly from the spreader 10 generally forwardly of and transversely to (in both directions) the direction of travel of the spreader 10 in a pattern less than 360 degrees and devoid of a rearward extent to avoid throwing material on the user walking behind the spreader 10.

When the user reaches the end of the path along which the material has been spread, the lever 38 is pivoted allowing the plate to move into covering relation with the discharge openings 30 to stop the particle flow. The spreader 10 is directed along a path generally parallel to the path just traversed and spaced an appropriate distance therefrom to avoid excessive overlap of material. The user pivots the lever 38 and pushes the spreader 10 to the end of the second path and the lever is again pivoted to halt particle flow. This procedure is repeated until the area is covered with material.

As disclosed in the above description, the dual mode spreader of the present invention utilizes both drop mode spreading means and broadcast spreading means to provide a spreader having the advantages of both. Particularly, the spreader of the present invention utilizes drop spreading means that are independent from the broadcast spreading means. Therefore, the operation in one mode is not dependent upon the other mode being operational. Therefore, the normal wear and tear associated with spreaders does not effect the spreader of this invention to the extent it effects other spreaders.

While the preferred and various embodiments of this invention have been disclosed, it should be understood that modifications and adaptations thereof could occur to persons skilled in the art. Other features and aspects of this invention will be appreciated by those skilled in the art upon reading and comprehending this disclosure. Such features, aspects, and expected variations and modifications of this invention are clearly within the scope of the invention where the invention is limited solely by the scope of the following claims.

We claim:

1. A dual mode spreader comprising:

a hopper to hold a supply of spreadable material;

first and second discharge openings located within said hopper for which said spreadable material can flow therethrough;

an impeller mounted in a position below said hopper for rotational movement about an upright axis, said first discharge opening leading to said impeller to enable said spreadable material in said hopper to exit said hopper onto said impeller to be distributed in a path outwardly therefrom during the rotational movement of said impeller; and a diffuser defining an inlet opening and an outlet opening, said second discharge opening in communication with said inlet opening to enable said spreadable material in said hopper to enter said diffuser and exit therefrom through said outlet opening to be distributed in a path downwardly therefrom onto the surface to be treated.

2. A dual mode spreader according to claim 1 further comprising means for controlling the flow of said spreadable material through said second discharge opening.

3. A dual mode spreader according to claim 2, wherein said means for controlling the flow of said spreadable material comprises a gate means, said gate means being movable between an open position wherein said spreadable material can flow through said second discharge opening and a closed position.

4. A dual mode spreader according to claim 3, wherein said gate means is incrementally adjustable between said open position and said closed position so that the flow of said spreadable material through said second discharge opening can be controlled.

5. A dual mode spreader according to claim 4, wherein said gate means further comprises easily observable indicia making it possible to accurately identify the flow rate of said spreadable material between full flow of said gate open position and no flow of said gate closed position.

6. A dual mode spreader according to claim 1, wherein said diffuser further comprises a plurality of baffles and pins located within said diffuser that diffuse said spreadable material as said spreadable material falls therethrough to evenly distributed said spreadable material across the entire width of said outlet opening.

7. A dual mode spreader comprising:
a hopper to hold a supply of spreadable material;
first and second discharge openings located within said hopper for which said spreadable material can flow therethrough;
an impeller mounted in a position below said hopper for rotational movement about an upright axis, said first discharge opening leading to said impeller to enable said spreadable material in said hopper to exit said hopper onto said impeller to be distributed in a path outwardly therefrom during the rotational movement of said impeller; and
a diffuser comprising a first wall and a second wall defining an inlet opening and an outlet opening, said second discharge opening in communication with said inlet opening to enable said spreadable material in said hopper to enter said diffuser and exit therefrom through said outlet opening to be distributed in a path downwardly therefrom onto the surface to be treated, and wherein said first wall is removably mounted to said second wall thereby permitting access to the interior of said diffuser.

8. A dual mode spreader according to claim 7, wherein said diffuser further comprises a plurality of baffles and pins located within said diffuser that diffuse said spreadable material as said spreadable material falls therethrough to evenly distributed said spreadable material across the entire width of said outlet opening.

9. A dual mode spreader according to claim 8 further comprising means for controlling the flow of said spreadable material through said second discharge opening.

10. A dual mode spreader according to claim 9, wherein said means for controlling the flow of said spreadable material comprises a gate means, said gate means being movable between an open position wherein said spreadable material can flow through said second discharge opening and a closed position.

11. A dual mode spreader according to claim 10, wherein said gate means is incrementally adjustable between said open position and said closed position so that the flow of said spreadable material through said second discharge opening can be controlled.

12. A dual mode spreader according to claim 11, wherein said gate means further comprises easily observable indicia making it possible to accurately identify the flow rate of said spreadable material between full flow of said gate open position and no flow of said gate closed position.

13. A dual mode spreader capable of acting as a drop spreader or a broadcast spreader, said dual mode spreader comprising:
a hopper to hold a supply of spreadable material;
first and second discharge openings located within said hopper for which said spreadable material can flow therethrough;
first and second rate flow means for controlling the flow of said spreadable material through said first and second discharge openings respectively;
an impeller mounted in a position below said hopper for rotational movement about an upright axis, said first discharge opening leading to said impeller to enable said spreadable material in said hopper to exit said hopper onto said impeller to be distributed in a path outwardly therefrom during the rotational movement of said impeller; and
a diffuser defining an inlet opening and an outlet opening, said second discharge opening in communication with said diffuser inlet opening to enable said spreadable material in said hopper to enter said diffuser and exit said diffuser at said outlet opening to be distributed in a path downwardly therefrom onto the surface to be treated.

14. A dual mode spreader according to claim 13, wherein said diffuser further comprises a plurality of baffles and pins located within said diffuser that diffuse said spreadable material as said spreadable material falls therethrough to evenly distributed said spreadable material across the entire width of said outlet opening.

15. A dual mode spreader according to claim 14, wherein said first and second rate flow means comprise first and second gate means respectively, said first and second gate means being independently movable between an open position wherein said spreadable material can flow through said first or second discharge opening and a closed position.

16. A dual mode spreader according to claim 15, wherein said first and second gate means are incrementally adjustable between said open position and said closed position so that the flow of said spreadable material through said first and second discharge openings can be controlled.

17. A dual mode spreader according to claim 16, wherein each of said first and second gate means further comprise easily observable indicia making it possible to accurately identify the flow rate of said spreadable material between full flow of said gate open position and no flow of said gate closed position.

18. A dual mode spreader capable of acting as a drop spreader or a broadcast spreader, said dual mode spreader comprising:
a hopper to hold a supply of spreadable material;
a discharge opening located within said hopper for which said spreadable material can flow therethrough;
an impeller mounted in a position below said hopper for rotational movement about an upright axis, said discharge opening leading to said impeller to enable said spreadable material in said hopper to exit said hopper onto said impeller to distribute said spreadable material in a broadcast manner in a path outwardly therefrom during the rotational movement of said impeller, and
means for dropping said spreadable material downwardly onto the surface to be treated, said means for dropping not utilizing said impeller to distribute said spreadable material said means for dropping being operative to distribute the spreadable material outward to a pattern wider than said discharge opening.

19. A spreader as set forth in claim 18 wherein said means for dropping comprises a diffuser.

20. A spreader as set forth in claim 18 wherein said diffuser has a generally triangular configuration.

21. A dual mode spreader capable of acting as a drop spreader or a broadcast spreader, said dual mode spreader comprising:

a hopper to hold a supply of spreadable material;

a discharge opening located within said hopper for which said spreadable material can flow therethrough;

an impeller mounted in a position below said hopper for rotational movement about an upright axis, said discharge opening leading to said impeller to enable said spreadable material in said hopper to exit said hopper onto said impeller to distribute said spreadable material in a broadcast manner in a path outwardly therefrom during the rotational movement of said impeller, means for dropping said spreadable material downwardly onto the surface to be treated, said means for dropping not utilizing said impeller to distribute said spreadable material;

ground-engaging wheels connected with the hopper for supporting the hopper on the ground;

a mechanism for transmitting rotational force of the ground-engaging wheels as they roll along the ground to the impeller to drive the impeller for rotational movement; and a handle for enabling a user of the spreader to manually propel the hopper over a selected ground area by rolling the wheels along the ground;

wherein the means for dropping said spreadable material downwardly onto the surface to be treated is operative to distribute the spreadable material outward to a pattern wider than said discharge opening.

* * * * *